United States Patent
Goel et al.

(10) Patent No.: US 7,389,396 B1
(45) Date of Patent: **\*Jun. 17, 2008**

(54) BOUNDING I/O SERVICE TIME

(75) Inventors: Atul Goel, Santa Clara, CA (US); Todd Mills, Sunnyvale, CA (US); Rajesh Sundaram, Mountain View, CA (US); Douglas Coatney, Cupertino, CA (US)

(73) Assignee: Network Appliance, Inc., Sunnyvale, CA (US)

(\*) Notice: Subject to any disclaimer, the term of this patent is extended or adjusted under 35 U.S.C. 154(b) by 261 days.

This patent is subject to a terminal disclaimer.

(21) Appl. No.: 11/114,648

(22) Filed: Apr. 25, 2005

(51) Int. Cl.
*G06F 12/00* (2006.01)

(52) U.S. Cl. .................. 711/167; 711/112; 711/114; 711/154; 711/156; 714/5; 714/15; 714/20; 714/42; 714/48; 714/55

(58) Field of Classification Search .................. 714/5, 714/15, 20, 42, 48, 55; 711/167, 112, 114, 711/154, 156; 707/206
See application file for complete search history.

(56) References Cited

U.S. PATENT DOCUMENTS

| 5,479,653 | A | * | 12/1995 | Jones | ............................ | 714/5 |
|---|---|---|---|---|---|---|
| 6,178,520 | B1 | | 1/2001 | DeKoning et al. | | |
| 6,397,347 | B1 | * | 5/2002 | Masuyama et al. | ............ | 714/5 |
| 6,457,139 | B1 | | 9/2002 | D'Errico et al. | | |
| 2003/0028719 | A1 | * | 2/2003 | Rege | ........................ | 711/112 |

OTHER PUBLICATIONS

Final Office Action dated Oct. 9, 2007 for Pending U.S. Appl. No. 11/114,648, filed Apr. 25, 2005, inventor Atul Goel.

\* cited by examiner

*Primary Examiner*—Stephen C Elmore
(74) *Attorney, Agent, or Firm*—Blakely, Sokoloff, Taylor & Zafman LLP

(57) ABSTRACT

A storage system with an array of redundant storage devices places bounds on access request servicing. If a storage device is unable to service the access request within the bounds, the storage system temporarily, individually offlines the specific storage device. Access requests pending for the storage device may be serviced by other storage devices of the redundant array while the storage device is offline. The offline storage device can perform error recovery and be brought back online by the system when error recovery has completed.

27 Claims, 7 Drawing Sheets

BOUNDING I/O SERVICE TIME

This application is related to U.S. patent application Ser. No. 11/862,236 of Goel et al., entitled "Selective Disk Offline," and filed concurrently herewith.

FIELD

Embodiments of the invention relate to storage systems, and more particularly, to providing bounds on I/O service time in a storage system.

BACKGROUND

A storage server is a special-purpose processing device used to store and retrieve data on behalf of one or more client devices ("clients"), which may access and/or process the data. A storage server can be used, for example, to provide multiple users with access to shared data and/or to backup important data.

A storage server may provide different levels of access to data. For example, a file server is an example of a storage server that provides file-level access to data. A file server operates on behalf of one or more clients to store and manage shared files in a set of mass storage devices, such as magnetic or optical storage based disks or tapes. The mass storage devices may be organized into one or more groupings (physical and/or logical or virtual) of Redundant Array of Inexpensive/Independent Disks (RAID). The data may be organized, managed, and/or accessed as data files. Another example of a storage server may be a device that provides clients with block-level access to stored data, rather than file-level access. The data in such a system may be organized and managed and/or accessed as data blocks, which may include more or less information than a file. Also, a storage server may be able to provide clients with both file-level access and block-level access.

A storage server may have access to multiple mass storage devices, or persistent/non-volatile storage devices, which may be managed based on logical or virtual organization. Data storage across these multiple mass storage devices can be organized into multiple layers of abstraction to provide fault tolerance, as individual disks can (and do) fail. The abstraction layers also allow a logical disk organization, for example, a volume or aggregate, to store larger quantities of data than can fit on a single disk.

For example, a storage server may represent a group of storage devices (e.g., hard disks) as a logical aggregate/ grouping of storage devices. The aggregates may be managed to store data in volumes contained within the aggregates. As used herein, volume refers to a logical abstraction of physical storage, combining one or more disks or parts of disks into a single logical storage object. The volumes may in turn be further logically broken down into plexes containing RAID groups. The RAID groups may have multiple disks. While particular terminology is used herein as a reference point to describe particular organizations and/or functions herein, the terminology shall not be construed as limiting, but rather by way of example. Where particular terminology is referred to (e.g., an aggregate, a plex, etc.), these are to be understood as merely examples of data structure abstractions that may be substituted with equivalent or similar data structures that may be referred to by other terms.

Tracking of disks in a logical organization and management of the logical organization may be performed with logical association data. The term "disk" is generally used herein as shorthand to refer to a disk drive, including its actual storage medium or media. A disk or other storage device may have a dedicated area to provide a RAID label and/or other metadata to provide the ability assign and determine which disks are part of which RAID groups, plexes, and aggregates, even as disks are added and failed out of the aggregates. The process of determining the logical data structure to which a disk belongs may be referred to as "RAID assimilation."

A storage device can develop errors (e.g., mechanical instabilities, medium corruption, etc.) that will hinder reading and/or writing to one or more areas/blocks of the storage device. Such errors often result in slow access times, especially if an access request focuses on bad media patches. Many storage devices have error recovery routines that can enable a distressed device to eventually complete the requested I/O (input/output, e.g., read, write) operation successfully. Performing an error recovery routine may include performing a recalibration routine, an automatic retry attempt, etc., and/or a combination of these. A storage device experiencing errors as described above may be referred to herein as a "distressed" drive, or a "spasming" drive. "Spasm" may be used herein to refer to an error resulting in a delay and/or the associated delay that results in slow data access.

Error recovery is traditionally handled "in-band," referring to the process of handling the error in the context of servicing the access request (or I/O) that spawned the error. The delay mentioned refers to the delay in servicing (e.g., processing, responding to, performing actions or operations as a result of) the request. Because all error handling is traditionally performed in- band, delays caused by errors are eventually pushed back to the requesting client. Thus, the client traditionally has to wait for the operation to be completed before the request can be acknowledged as complete or successful, if it can be so acknowledged at all. At worst an error message is passed to the client instead of an acknowledgement of success, or the client request results in an error in the filer or client interface.

Hardware commoditization and the continuously decreasing cost of storage (price per GB) is driving a trend towards using less reliable, higher capacity drives for building storage servers and disk arrays. As deposition densities on drives increases, the effects of bad patches on the media become more apparent. Bad media patches can substantially degrade read/write performance, for example, with increased completion latency, especially if I/O happens to focus on the regions of bad media. Drives use an in-built error recovery scheme (native to the drive) when reading/writing blocks within a bad media patch that may take a relatively long time to complete.

As one example, ATA drives use an in-built recovery that can range in duration from multiple seconds to even minutes. In desktop usage where the inability to read a block can prove fatal to system operation, such latency may be acceptable. However, in server environments, long I/O operation complete times may be unacceptable. In another example, FC drives typically use a deterministic error recovery, which can prevent the long I/O delays discussed above. However, successive media errors can still result in cumulative queuing delays that can result in application timeouts and/or system hangs if I/Os cannot be completed within an acceptable time-period. Traditionally, storage systems have either resorted to failing such drives, which results in a costly drive reconstruction, or simply operated with exposure to the risk of application downtimes.

The duration of recovery routines to prevent failure of I/O operations on a spasming drive can range from multiple seconds to minutes, which may be acceptable for certain environments. However, in certain server environments, many data access protocols (e.g., CIFS (common Internet file services/systems), FC (Fibre Channel), NFS (network file services/system)) rely on lease timeouts for maintaining session state, meaning long delays in I/O access time can lead to unwanted connection terminations. Additionally, in file server/filer system configurations, many I/O accesses (e.g., a stripe write) are associated with parallel accesses to other storage devices in a redundant array (protection unit). Traditional systems delay returning the parallel results until all parallel I/O accesses are completed by the individual storage devices of the protection unit. Thus, a single spasming drive can cause a delay for data access from multiple storage devices.

File server/filer configurations typically use redundant drive arrays with mirroring and/or redundancy (e.g., RAID), enabling the systems to regenerate the data on one drive by accessing a subset of drives within a protection unit to which an unresponsive drive belongs. The latency for reconstructing data in this manner should be of the same order as a single drive latency, which is on the order of milliseconds. Assuming that the probability of multiple drive spasming at the same time is very low, reconstructing blocks to service an I/O request should be much faster than accessing a spasmic drive. Thus, successful access that causes a long delay may cause a more deleterious effect on system performance than would be caused by outright failure of the device. Additionally, a subsequent I/O request to the distressed device may trigger the same fault or a related fault, resulting in further client requests being delayed. However, the cost of failing out a device that does not have fatal errors may not be justified.

Besides individual disk errors and resulting access delays experienced by clients attempting to access data stored on a spasming disk, individual disk errors can compound and result in performance problems with the filer. For example, some error recovery attempts in high workload scenarios can result in a cumulative backoff causing a filer operating system to freeze up.

SUMMARY

A storage server having an array of storage devices dispatches a client data access request to a storage device of the array. The time of dispatch of the data access request can be monitored and bounded to prevent the data access request taking longer than a threshold amount of time before the storage server intervenes. The storage server can offline the storage device from receiving/processing data access requests while the storage device is offline. After a period of time, the storage server can determine whether to resume data access to the storage device.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
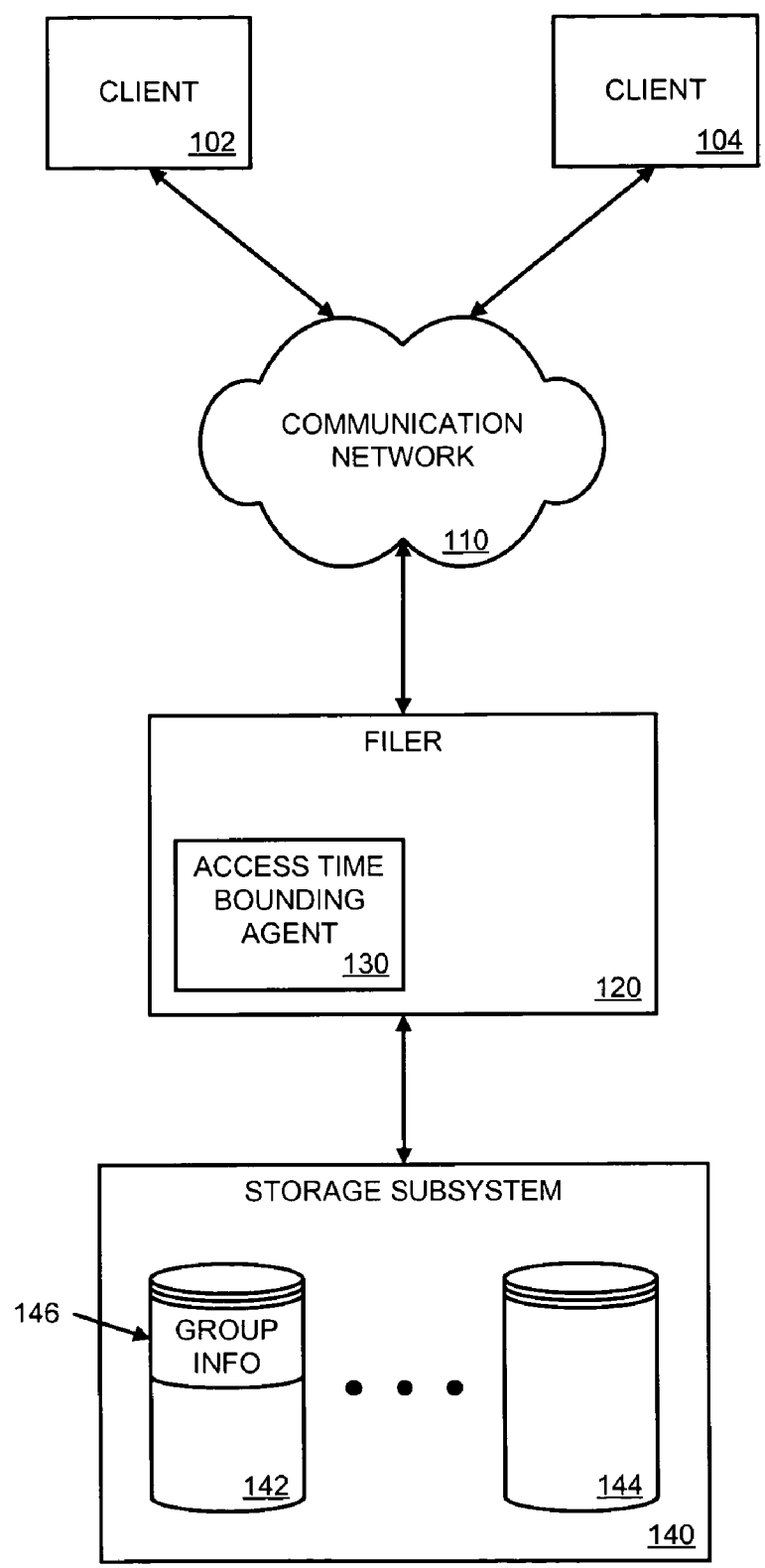
FIG. 1 is a block diagram of an embodiment of a storage system including a filer with an access time bounding agent.

As used herein, references to an "embodiment" may be understood as describing a particular feature, structure, or characteristic included in at least one embodiment of the invention. Thus, the appearance of phrases such as "in one embodiment," or "in alternate an embodiment" may describe various embodiments and implementations of the invention, and may not necessarily all refer to the same embodiment. Descriptions of certain details and implementations follow, including a description of the figures, which may depict some or all of the embodiments described below, as well as discussing other potential embodiments or implementations of the inventive concepts presented herein.

A redundant array of mass storage devices (e.g., RAID (redundant array of inexpensive/independent disks)) storage subsystem, or any other configuration where data on a given mass storage device can be recovered by using a subset of other mass storage devices within a protection unit, may be enabled to temporarily cease access (e.g., input/output (I/O) functions/operations/transactions) to a particular mass storage device of an array of mass storage devices. I/O functions/operations/transactions refers herein to access to a mass storage device, for example, a disk read request (or simply "read") or disk write request (or simply "write"). As used herein, mass storage devices refer to any type or form of non-volatile storage device/means suitable for storing large quantities of data. Mass storage devices include, but are not limited to, conventional magnetic disks (e.g., hard disks), optical disks, for example CD-ROM (compact disk—read only memory) or DVD (digital video/versatile disc) based storage, flash storage, etc. Mass storage devices may be referred to as disks, drives, storage units, hard disk, etc., but will be collectively, generically referred to herein as "disks" merely for purposes of convenience in description. Reference herein to disks should be construed only as illustrative, and not as limiting. The organization of disks into protection units refers to RAID groups, or any similar/comparable logical grouping of disks. Many types of RAID arrays or other redundant disk arrays are known, many based on standards, and others proprietary. As used herein, "RAID group" refers generically to any type of RAID array, redundant disk array. Reference to a "logical grouping" of disks is an abstraction that refers to any of multiple layers of virtual organization of physical resource, for example, a RAID group, and/or groupings of RAID groups. Ceasing I/O to a disk may be referred to as "offlining" the disk for a period of time. The following description includes reference to selective offlining, and certain overviews and/or details may be briefly covered. Additional description of selective disk offlining can be found in U.S. patent application No. TBD, entitled "Selective Disk Offlining," of Goel et al., filed TBD.

Because an offline drive is inaccessible for I/O operations, during the offline period reads to the disk may be serviced by reconstructing data from other disks within the redundant array group. Servicing a read (or a write or other I/O request/operation) refers to processing, responding to, performing actions or operations as a result of, etc. the read. Writes can be logged to a "dirty region" log, which refers to a storage region/area to which updates to data on the disk may be placed while the disk is offline. In one embodiment a filesystem employed with this technique allows for writing out of place, or writing anywhere. Writing out of place is in contrast with a write-in-place approach where a data block, when modified, is written to the same physical location on disk. With write out of place, any time a data block is modified it is written to a new physical location on disk. A filesystem that has a write anywhere property can write to any unallocated block on any available disk in a group, and does not have to write to a particular location for a particular "file" or block of data. A write out of place filesystem stores data writes in unallocated blocks instead of writing over already allocated data blocks. Thus, data is not overwritten, and a particular disk/block is not used for any subsequent write that changes data stored at the particular disk/block.

To provide selective offlining, a trigger mechanism indicates when a disk is inaccessible and/or should be offlined. A software module on a storage access path of a filer/file server may receive certain commands and/or interpret/respond to certain conditions that indicate an offlining circumstance. A command may be issued by an administrator, a hardware component, another software module, etc. A condition may be indicated by a hardware component or software that monitors hardware conditions. An example of a condition that may trigger selective offlining is a spasmic disk condition, which may result in deleterious delays in traditional systems that have unbounded I/O access. Spasmic, or a spasmic disk condition, as used herein, refers to a state or condition of error resulting in a delay, and may also refer directly to the delay associated with the error or other condition that results in slow data access. The error may be caused by any number of events/conditions causing a disk to be or become unresponsive, meaning that the disk does not respond to and/or is not timely in completing an I/O transaction or does not complete an I/O in a timely within a period of time. For purposes of example, and not by way of limitation, disk spasm conditions may include disk or shelf firmware freezes/hangs, disk media errors, service access processing errors/exceptions, etc.

A storage system with a selective offline mechanism may further include a mechanism for bounding service times for I/O directed to a disk of a RAID array subsystem. In general bounding service times for I/O includes a triggering mechanism, an I/O handling procedure, and potentially a subsequent recovery procedure for errors (e.g., an out-of-band recovery mechanism). The trigger mechanism may determine whether a disk is experiencing an error, for example, a spasmic error. The trigger could be related to a period of time, for example, comparing a period of time an I/O has been pending against a threshold (e.g., a time limit, a core value, a period of time, an expected duration, an allocated time for response, etc.). The period of time an I/O has been pending may be considered to be a response time of the disk. In one embodiment the trigger accounts for an expected recovery time for the disk. The I/O handling procedure includes processing of I/O for servicing when the spasming disk is unable to complete the operation within the bounds established. The recovery procedure includes error processing of the disk to attempt to correct the error. By bounding I/O service times, a system can ensure service guarantees for access times from disks in the system. Additionally, an out-of-band error recovery can be implemented to allow error recovery without failing the disk out of the system.

In one embodiment one or more software-based mechanisms for bounding disk I/O service times are provided to implement and/or enforce one or more timeout thresholds for disk I/O service time. A timing mechanism determines a timeout threshold, which may be related to a threshold used by an application protocol, etc. The timing mechanism, or another timing mechanism, monitors I/O delay to determine if the I/O has exceeded the threshold. After a timeout threshold has been reached, a disk may be selectively offlined out of the storage system for error recovery (to be reinducted back into the system when error correction completes). Offlining the disk includes isolating the disk from I/O routines for a period of time, and may be referred to as placing the disk out-of-band. Isolating the disk refers to temporarily ceasing I/O to the disk, or not allowing access to the disk for storage service (e.g., reads, writes) during the period of time. The period of time refers to a length of time that may be predefined, or may be as long as necessary for a system to resolve an error condition and/or determine to fail a disk. Recovery of a disk error while the disk is offline may be similarly be referred to as out-of-band recovery.

In general, a software mechanism for error recovery in a driver for a disk can be considered to have two error recovery algorithms: a default process, and a spasmic error process. The two error recovery algorithms coexist in a system. The individual disks of the RAID array subsystem typically include error processing algorithms, which may be referred to as a standard, or built-in error recovery/error processing mechanism. In one embodiment the default error recovery algorithm is identical to the standard error processing mechanism for a disk. The default/standard mechanism relies on a sequence of retries, resets, power cycle phases for servicing an I/O error, and/or waiting for the disk's standard error recovery to attempt to correct an error. The default algorithm may operate on a "best-efforts" basis, meaning all attempts to recover will be made before failing a disk.

Spasmic error processing, instead, will force the driver (i.e., software managing/controlling a disk) to abort an I/O that cannot be completed within a defined threshold time period. The disk may be offlined to perform error recovery to attempt to prevent similar errors from recurring. The storage system employs a multi-stage error processing algorithm to attempt recovery by a disk's standard error recovery routines, as well as providing an additional error recovery layer to place bounds on the implementation of the disk's standard error recovery. The disk can be allowed to attempt recovery in-band, meaning in the context of the client I/O request made to the disk, which implies that the I/O does not necessarily complete until the recovery is in progress. After a period of time, if the error has not been corrected, the in-band error recovery is converted to out-of-band error recovery, by selectively and temporarily removing the spasming disk from the storage system. The entire error recovery process (in-band and out-of-band) proceeds transparently with respect to end clients, and may increase the performance and availability of storage servers by ensuring that the latency expectations of a disk are bounded.

Within a filer/file server, a storage layer communicates spasmic conditions to a RAID controller. A disk offline module within RAID, or accessible to RAID, ceases I/O to the disk, and offlines the disk until it recovers from its spasmic state. In general, the disk offline module removes the disk from a RAID group and/or other logical data structure. A logical data structure that is missing a disk may be considered "degraded," which may temporarily change how the logical data structure is handled. During the offline/degraded period, reads to the disk are serviced by accessing other disks within the redundant group, or reads to a data mirror or backup, and writes are logged using a dirty bitmap, and/or written to a dirty region. After the disk recovers from its spasmic state, RAID onlines the disk and synchronizes the dirty region either via copying from the dirty region log by reconstructing ranges marked dirty with a dirty bitmap.

The logic for indicating I/O for which a spasmic error recovery algorithm is used is orthogonal to the mechanism used for tracking logical block address (LBA) ranges that might potentially be a cause of a spasming condition. RAID uses a flag to indicate to a disk driver those I/Os for which the driver should use the spasmic error recovery algorithm. In one embodiment this flag is set only for client I/Os that are latency sensitive and not for internal RAID generated I/Os (e.g., periodic scrubs). In another embodiment this flag is set for all I/Os. The flag can be appended to individual I/Os to provide a differentiation between the standard and spasmic error recovery algorithms that should be executed for different I/Os. In contrast, a spasmic LBA range is an LBA range that was being processed by the disk when a spasmic condition was detected (e.g., the I/O took longer than the threshold time allowed). The spasmic condition detected could be any command pending on the disk, and is not necessarily a request with a spasmic flag set. Irrespective of command type, as soon as a spasmic condition is detected, I/Os with spasmic flags set should be aborted, forcing the disk to be offlined for spasmic error recovery. For other I/Os already in progress, default error recovery processing can be used. Since the disk is offlined, subsequent I/Os will be temporarily prevented from reaching the disk. Due to command queuing, which permits multiple commands to be dispatched to a disk, it is possible for the filer to not know exactly which command was being processed by the disk, and therefore conclude that all pending commands were the cause of the spasm.

The flag/message can provide a driver the ability to aggressively bound I/O service times for a disk. For example, the driver may track bad media patches, and force an associated disk offline for all I/Os directed to the bad patches. Bounding the I/O service times may also include determining whether a default error recovery is expected to involve more or less cost (e.g., time, processing) than would be involved in forcing the disk offline. For I/Os expected to take shorter than offlining, the default procedure may be used, while a disk is offlined when the default recovery procedure is expected to take longer than offlining. A time threshold may be set that would be based on system latency tolerance, and/or disk type. In one embodiment a formula is used to determine whether to trigger a spasmic condition processing, including offlining the disk. For example, the formula (time since I/O was dispatched)+(expected recovery time)>(I/O threshold) provides one implementation of determining whether to trigger spasmic processing. The value (time since I/O was dispatched) refers to a period of time since the filer transmitted the I/O operation to the storage subsystem hardware for processing. The value (expected recovery time) refers to an optional value that could be used in the formula. In one embodiment a state machine can track the state of an individual disk, and knows a general error recovery procedure that will be used by the disk (e.g., when the disk will be triggered to hard reset, or power cycle, etc.). With knowledge of the error recovery procedure, and the current state, the filer can determine whether to wait for the standard procedure to continue, or whether to aggressively trigger spasmic processing (i.e., prior to the point at which the time since the I/O was dispatched is greater than the threshold). The duration of time the error recovery procedure will take or is expected to take may be referred to as an error recovery time. The error recovery time is the length of time from the state the disk is currently in until an error recovery event (e.g., a reset, a powercycle) should occur. The value (I/O threshold) refers to a value determined for the particular disk, and may be different for each disk and/or subsystem protocol used. In one embodiment the value can be computed based on the timeout thresholds used by an application protocol (e.g., NFS, CIFS, FCP). The value can also be computed based on heuristics for determining the maximum amount of time an I/O can take in order to prevent a freeze-up of a checkpointing file system.

One common storage system configuration includes the use of shelves of disks, or some similar physical grouping hardware/software combination. The physical grouping is controlled by a physical grouping controller that has a processor/control logic, and possibly software/firmware to provide the control functions. Triggering a spasmic condition could be limited to commands already dispatched to the shelf controller or equivalent. In one embodiment commands still queued at the storage layer of the filer and not yet dispatched to the physical grouping controller are not valid candidates for flagging. Limiting the spasmic condition triggering in this way can ensure correct identification of spasms due to misbehaving disks, as opposed to long I/O times due to other causes, for example, deep queues. In one embodiment spasming conditions are triggered for any command, either pending or dispatched to the disk/shelf controller, as long as the I/O threshold is exceeded. Additionally, because offlining a disk results in a mode of temporarily degraded operation, triggering offlining might not be necessary for I/O that are not sensitive to high latency, for example, internal I/Os, scrubs, etc. RAID can use the timeout flag mentioned above to specify I/Os that might be aborted if a spasmic condition is detected.

One cause of spasmic conditions may be bad media patches (e.g., mechanical errors, weak signal stored on the medium, etc.). In some other instances, long I/O times are the result of poorly performing disk firmware. In either case, the command being processed by the disk at the time the spasmic condition is detected is identified as the cause. In certain conditions, it may become difficult to identify the spasmic command, for example, in ATA disks that support command level queuing. In such cases, block ranges corresponding to all commands dispatched to the disk may be treated as bad media patches, resulting in the disk being offlined to an out-of-band recovery condition. Block range(s) suspected to be the source of the spasmic condition can be fixed during the recovery phase.

Spasmic error processing may operate to place a disk in an out-of-band state. A default error processing may begin prior to the disk being offlined (placed out-of-band), and proceed to completion out-of-band. Alternatively, the error processing can be started and completed out-of-band. Placing the disk out-of-band for error processing can simultaneously allow error recovery to proceed to lower the risk of failure (and avoid removing the disk from the system for a recoverable error), while still providing bounded access times. Placing the disk out-of-band to accomplish error recovery may allow the use of more extended diagnostics than would be available to an in-band disk (e.g., for purposes of delay and/or disk accessibility). Use of extended diagnostics may avoid resorting to full reconstructions for spasmic errors, which can increase system reliability by reducing exposure to data loss via non-recoverable media errors and reducing disk failure rates.

In one embodiment, a disk that is unable to respond to an I/O may be expected to recover if a hard reset or a power cycle were performed. If a hard reset or a power cycle is part of the default error recovery, RAID can force such a condition by issuing a dummy I/O. The dummy I/O is an I/O (e.g., a write, or potentially a read) request to the block range corresponding to a bad media patch. The dummy I/O will not have the spasmic flag set to indicate that a full error recovery cycle must be executed. The dummy I/O mechanism can provide a form of out-of-band error recovery by using the default error recovery processing to bring the disk back to service. Issuing the dummy I/O will invoke the error recovery processing, which can result in a hard reset and/or powercycle phase as part of the default recovery process. The hard reset could help the disk recover from a spasmic state. In one embodiment a block range suspected to be the source of the spasmic condition may be fixed during the optimized reconstruction stage by marking it dirty when offlining the disk. The block range can also be fixed during the recovery phase.

Alternatively, a successful reply to a dummy I/O request may indicate recovery of the disk, which may trigger a recovery notification be sent to RAID. RAID uses the notification to online the disk. A synchronization phase of bringing the disk online might either be done by copying data from the dirty range log or by reconstructing block ranges identified in the dirty bitmap. As soon as the disk is onlined (in one embodiment, even before a synchronization phase can be completed), spasmic error processing can be enabled for I/Os to that disk.

In one embodiment RAID keeps track of the spasmic history for each disk. If a disk enters a spasmic state a threshold number of times, RAID marks the disk as failed or potentially failed. The failed disk would typically be replaced with a good spare.

FIG. 1 is a block diagram of an embodiment of a storage system including a filer with an access time bounding agent. Filer 120 includes a storage server with an access time bounding agent 130, which includes a recovery module. Filer 120 may provide file-level services, as with traditional file servers, and alternately, or in addition, may provide block-level services. Thus, as used herein filer 120 may refer to a storage server that provides file-based (e.g., NAS (network attached storage)) services, or alternatively, or in addition, a storage server that provides block-based (e.g., SAN (storage area network)) services. The data services, whether file-level or block-level, include providing access to storage subsystem 140, for either data storage and/or data retrieval. Data storage and retrieval are examples of disk I/O that may be performed with mass storage devices 142 and 144.

Filer 120 may be coupled locally to storage subsystem 140, which includes one or more mass storage devices 142-144. Mass storage devices 142-144 in storage subsystem 140 may be, for example, conventional magnetic disks (e.g., hard disks), optical disks such as CD-ROM or DVD based storage, magneto-optical (MO) storage, and/or any other type of non-volatile storage devices suitable for storing large quantities of data. Filer 120 includes one or more connectors and/or connection ports with which to couple to storage subsystem 140 and/or one or more of its sub-elements. The connectors and/or ports may be connection points for fiber channel, coaxial cable, twisted-pair communication lines, and/or secure wireless connections.

Filer 120 manages storage subsystem 140, including receiving and processing read and/or write requests to data stored in storage subsystem 140, maintaining data structures, organizing the physical resources of storage subsystem 140 into logical storage resources, etc. The data structure and logical storage resources are constructs for storage management to allow more storage in a system, provide reliability in storage access, etc.

Filer 120 includes access time bounding agent 130, which represents one or more hardware and/or software components/modules to provide I/O service time bounding functions to filer 120. Access, or I/O service, time bounding refers to providing bounds or limits on how long an access can take, for example, by limiting how much time a certain access operation will be allowed to proceed without intervention. Accessing bounding agent 130 enables filer 120 to establish and enforce time constraints on access to individual storage devices of storage subsystem 140. For example, if mass storage device 142 experienced an error that resulted in a long access time (e.g., due to error recovery processing), access time bounding agent 130 could service the access request with alternative mechanism(s) and temporarily prevent access to mass storage device 142.

In one embodiment mass storage device 142 is shown having group information 146. Group information 146 may include one or more values, data structures, pointers, etc., to indicate a logical association of mass storage device 142 with other mass storage devices. Thus, group information 146 may represent metadata stored on mass storage device 142 to indicate an association/role/place of mass storage device 142 in the logical organization of the physical resources. Group information 146 may indicate a data structure to which mass storage device 142 belongs.

Filer 120 is coupled to one or more clients 102-104 through communication network 110. Communication network 110 may be, for example, a local area network (LAN). Each client 102 and 104 may be a conventional desktop computer, a laptop, workstation, a network server, etc. Clients 102 and 104 generate requests for access to data on storage subsystem 140. Filer 120 services the requested access functions to clients 102 and 104, depending on what request is made, what permissions a client has, etc.

Filer 120 may have a distributed architecture. Thus, in one embodiment filer 120 may include a separate N- ("network") blade and a D- (disk) blade (neither shown in FIG. 1). In such an implementation the N-blade couples filer 120 to communication network 110 to communicate with clients 102-104, and the D-blade includes the file system/storage management functionality and couples filer 120 to storage subsystem 140 to communicate with the corresponding storage resources. The N-blade and D-blade communicate with each other using an internal protocol. Alternatively, filer 120 may have an integrated architecture, where the network and data components are contained within a single box and/or single circuit component/manufacture. Filer 120 further may be coupled through a switching fabric to other similar filers/file servers (not shown), each having its own local storage subsystem. In this way, one or more storage subsystems can form a single storage pool, to which a client of any of the file servers may be provided access.

Figure 2:
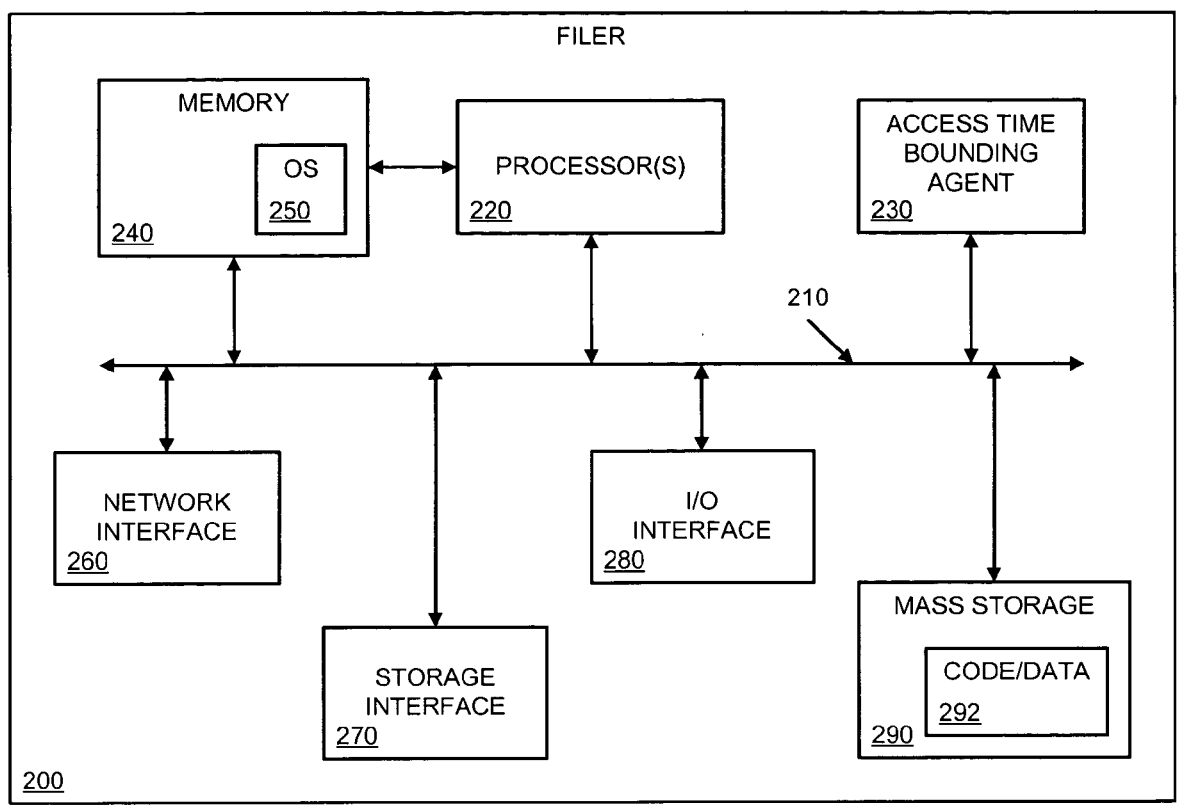
FIG. 2 is a block diagram of an embodiment of a filer.

FIG. 2 is a block diagram of an embodiment of a filer. Filer 200 provides one example of filer 120 of FIG. 1, and may include other components/subparts in addition to what is depicted in FIG. 2. Thus, filer 200 may be more complex than what is shown. Filer 200 includes one or more processors 220, and memory 240 coupled to processor 220. Processor 220 may include any type of microprocessor, central processing unit (CPU), processing core, etc., suitable for executing the functions of filer 200 within the performance criteria determined for the system design. Processor 220 controls the overall operation of filer 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 240 represents the main memory of filer 200 to provide temporary storage for code to be executed by processor 220. Memory 240 may include read-only memory (ROM), flash memory, one or more varieties of random access memory (RAM), or the like, or a combination of such devices or technologies. Memory 240 stores, among other things, operating system (OS) 250 that provides one or more functions of filer 200. OS 250 may include one or more functions for selective disk offlining, out-of-band recovery, and disk access time bounding, as described herein.

In one embodiment filer 200 includes access time bounding agent 230, which provides one example of an access time bounding agent according to access time bounding agent 130 of FIG. 1. Access time bounding agent 230 depicted in FIG. 2 is an abstraction to represent the one or more functions provided by filer 200 to perform functions related to offlining one or more specific disks, while leaving other disks and the system online to ensure bounds on I/O service times. While specifically referring to disks as providing examples herein, any type of disk, storage unit, drive, etc., may be used. The functions provided to implement access time bounding may be provided as a separate module, as shown, or may be provided by one or more components of OS 250. Thus, access time bounding agent 230 is to be understood as merely illustrative of the functionality provided to provide bounds on service times of I/O requests, and is not limited to a particular implementation. Access time bounding agent 230 could be provided as a programmable circuit component coupled to bus system 210, as part of OS 250, as part of an application/program executing on top of OS 250, or some combination of these.

Processor 220 and memory 240 are coupled to bus system 210. Bus system 210 is an abstraction that represents any one or more separate physical buses, communication lines/interfaces, and/or point-to-point connections, connected by appropriate bridges, adapters, and/or controllers. Therefore, bus system 210 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Also coupled to processor 220 through bus system 210 are one or more network interface(s) 260, one or more storage interface(s)/adapter(s) 270, one or more input/output (I/O) interface(s) 280, and one or more internal mass storage device(s) 290. Network interface 260 provides filer 200 with the ability to communicate with remote devices (e.g., clients) over a network and may be, for example, an Ethernet adapter. Storage interface 270 enables filer 200 to access a storage subsystem and may be, for example, a Fibre Channel adapter, a SCSI adapter, etc. Filer 200 may typically be accessible to electronic or computer "users" rather than human users. Thus, I/O interface 280 may include one or more interface components to connect filer 200 with other electronic equipment, for example, custom connections, blade adapters, etc. Additionally, filer 200 could be made to be accessible to a human user, and thus have video, audio, and/or alphanumeric interface through I/O interface 280. Internal mass storage 290 may be or include any conventional medium for storing large volumes of data in a nonvolatile manner, such as one or more magnetic or optical based disks. Mass storage 290 may hold data/instructions in a persistent state (i.e., the value is retained despite interruption of power to filer 200). In a generic sense mass storage 290 is a "memory," although memory 240 is the executing or operating memory to provide instructions to processor 220. In one embodiment mass storage 290 includes code and/or data 292 that may be accessed and placed in memory 240 for execution by processor 220. Code/data 292 may include machine instructions to provide disk access time bounding functions.

Figure 3:
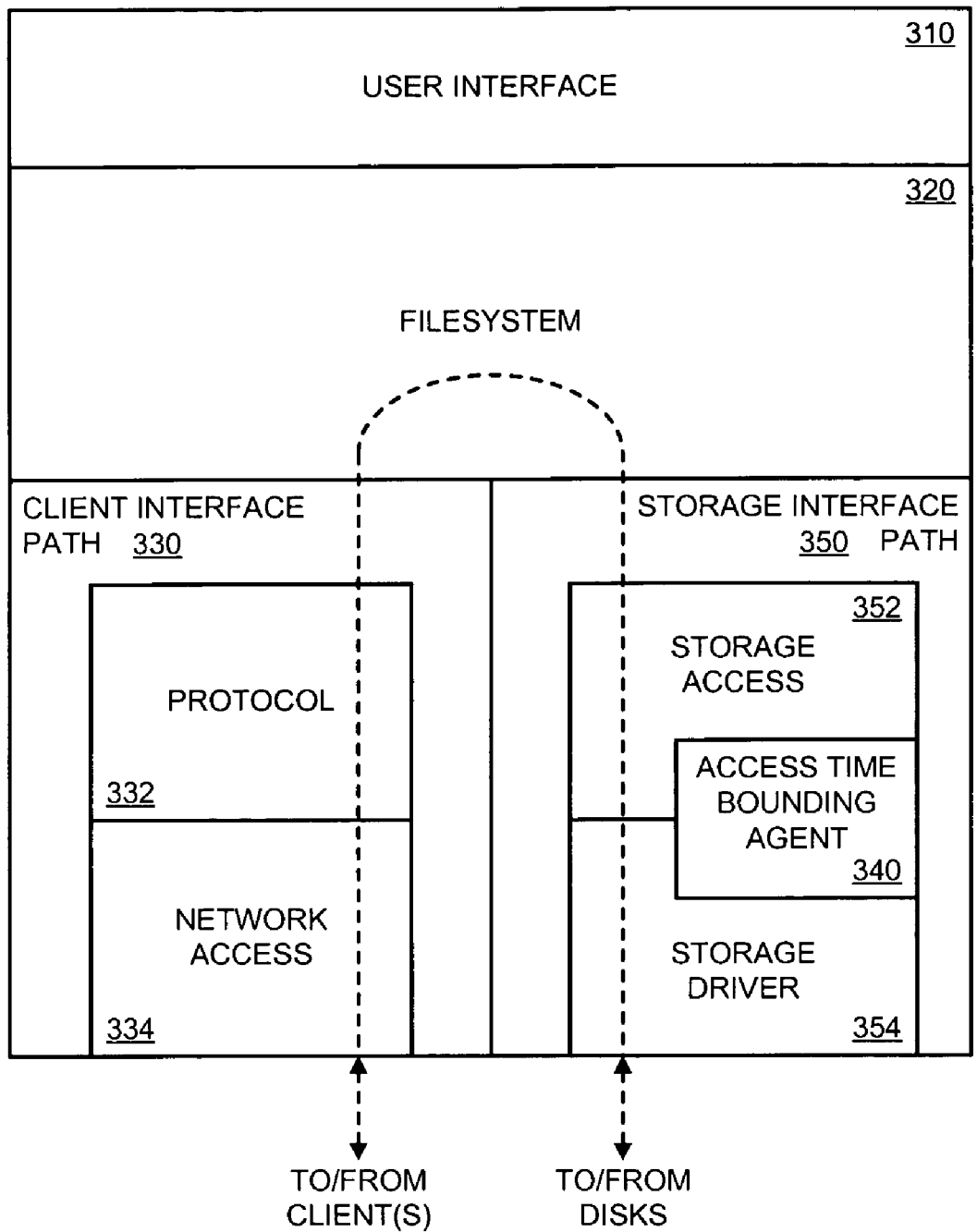
FIG. 3 is a block diagram of an embodiment of a storage server operating system.

FIG. 3 is a block diagram of an embodiment of a storage server operating system. Operating system 300 is one example of an operating system that could implement OS 250 of FIG. 2. As shown, operating system 300 includes several modules or functional components, which may also be referred to as "layers." One layer includes user interface 310, to provide access to a user, for example, a human user, a management system, a diagnostic server, etc. File system 320 is located logically below user interface 310. File system 320 is application-layer software that tracks/maintains a directory structure (hierarchy) of data stored in an associated storage subsystem, and manages read/write operations on the data (i.e., executes read/write operations on the disks in response to requests). Logically below file system 320, operating system 300 also includes client interface path 330, and storage interface path 350.

Client interface path 330 is depicted with protocol layer 332 and network access layer 334 associated with protocol layer 332, to allow file system 320 access over a network with clients. Client interface path 330 may be understood to include more components than what are depicted in FIG. 3. Protocol layer 332 implements one or more of various higher-level network protocols, such as Network File System (NFS), Common Internet File System (CIFS), Hypertext Transfer Protocol (HTTP) and/or Transmission Control Protocol / Internet Protocol (TCP/IP), Fibre Channel Protocol (FCP), and/or iSCSI Protocol (SCSI over TCP/IP). The protocol may be different for separate connections to different clients. The protocol may be established prior to operation of the system, or negotiated at run time. Network access layer 334 includes one or more drivers or other medium-interface software routines/programs that implements a lower-level protocol to implement the protocol of protocol layer 332 in a physical interface to communicate over the network, such as Ethernet.

Storage interface path 350 includes storage access layer 352 and storage driver layer 354 associated with storage access layer 352, to enable file system 320 to communicate with one or more disks and/or other storage resources in a storage subsystem. Storage interface path 350 is also to be understood as merely representative, and may include more components and/or layers than what are depicted. Storage access layer 352 implements a disk storage protocol, such as RAID, and storage driver layer 354 implements a lower-level disk access protocol, such as Fibre Channel Protocol (FCP), SCSI, advanced technology attachment (ATA), serial ATA (SATA), serial attached storage (SAS), etc., which may implement commands/requests made by the higher level protocol. To facilitate the description of the following details herein, it will be assumed that storage access layer 352 implements RAID, such as RAID-4, RAID-DP (created by Network Appliance Inc.), etc., and therefore may alternatively be referred to as RAID layer 352. FIG. 3 also shows a dashed line to represent a data flow path between a client and a disk, through the layers of client interface path 330, file system 320, and storage interface path 350.

In one embodiment storage interface path 350 includes access time bounding agent 340, which is an example implementation of an access time bounding agent as previously discussed. Access time bounding agent 340 is depicted as potentially intersecting both storage access layer 352 and storage driver 354, which represents that functions of access time bounding agent 340 may interact with and/or implicate functions at both layers. Storage access layer 352 detects disks accessible through storage driver 354 and organizes the disks into logical data structures. These data structures may include RAID groups, plexes, aggregates, volumes, and/or any similar or equivalent data container abstraction. Access time bounding agent 340 provides storage access layer 352 the ability to detect disks that will potentially result in access delays, and in response, selectively affect the organization of the logical data structures. For example, a disk may experience a spasmic condition, and access time bounding agent 340 determines the condition will result in access delays, and offline the disk to convert an in-band error recovery to an out-of-band error recovery. Access time bounding agent 340 provides a mechanism between filesystem 320 and the disk to temporarily interrupt I/O to the disk to isolate it from the system until the error recovery brings the disk back online. Access time bounding agent 340 may provide one or more timing mechanisms for use at the driver level (storage driver 354) to establish and monitor access time thresholds after which a disk should be temporarily offlined.

Figure 4:
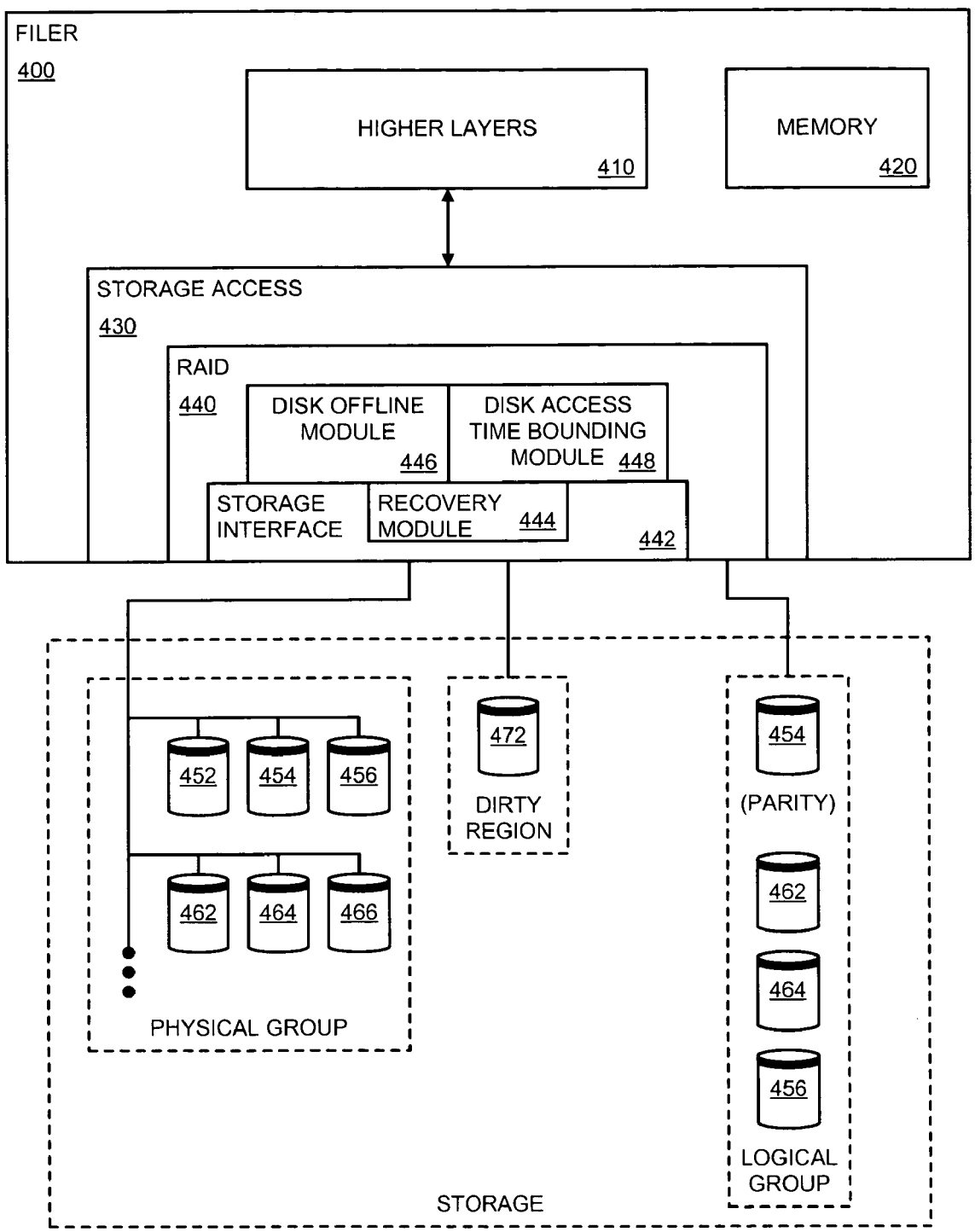
FIG. 4 is a block diagram of an embodiment of a filer having storage access with a disk access time bounding module.

FIG. 4 is a block diagram of an embodiment of a filer having storage access with a disk access time bounding module. Filer 400 represents an example of a filer/file server as previously discussed, and is shown in FIG. 4 with some of the layers of an operating system that may be present on filer 400, such as OS 300 of FIG. 3. Higher layers 410 represent layers higher than storage access layer 430, which may be a storage access layer as described in FIG. 3, and include a RAID layer, as discussed above. Higher layers 410 may include, but are not limited to having, a file system and a storage server kernel. In one embodiment, higher layers 410 include a write-anywhere file system, such as the WAFL system.

In one embodiment filer 400 includes memory 420, which may have one or more elements of volatile and/or non-volatile storage. For example, memory 420 may include RAM. Memory 420 may refer to a physical resource of filer 400, or it may refer to a persistent or temporary storage resource accessible to filer 400 that is not necessarily part of filer 400. In one embodiment memory 420 is a memory allocation of the main memory of a system to which filer 400 belongs. Memory 420 includes information referencing the storage on disks 452-472, and may store state information that is used to determine to perform spasmic error processing on one or more of disks 452-472. A data structure representing a virtual layout (e.g., the logical group shown) of the physical disks 452-472 could exist in memory 420. The data structure can be dynamically modified as the system is operational, to cease I/O to/from an individual disk. Selectively ceasing I/O to a disk provides an environment in which bounds can be placed on disk access times.

Storage access 430 may include hardware (e.g., ports, interfaces) and/or software (e.g., a RAID layer) to see and organize the storage in a virtual representation. Storage access 430 includes RAID 440, which sees/detects the physical resources (e.g., disks) of the system and provides logical data structures. For purposes of description, and not by way of limitation, FIG. 4 will reference disks as the physical resources, and RAID groups, volumes (which may be understood as traditional, or virtual volumes), and aggregates as the data structures. Other and/or additional data structures may be included within the system, and physical resources besides, or in addition to, disks may be used. RAID 440 provides the logical hierarchy of the system resources, and thus provides the RAID groups and aggregates.

Within RAID 440, or logically below RAID 440 may be one or more storage interface components 442. RAID 440 may include one or more components, not shown, to access and manage the storage through storage interface 442, such as an assimilation module to provide physical to logical mapping of the physical resources to higher layers 410 of filer 400. Thus, filer 400 may "see" the physical resources as represented in the logical group, with the disks allocated by RAID 440 for storage. The particular allocation of the physical resources may not be significant to filer 400, which will simply provide storage services to clients based on what resources are seen as available for the clients.

The storage of the system of FIG. 4 may include more disks than what is shown. In one embodiment disks in the storage are organized, physically and/or virtually, in groups. As a physical grouping, the disks may represent a set of disks that share a common storage access component, for example, disks on a shelf in a storage system, or interfacing a communication port. As a logical grouping, the disks may represent disks that are part of the same RAID group, for example.

RAID 440 also includes recovery module 444 within storage interface 442. Recovery module 444 represents one or more components and/or routines to provide error recovery when a disk error is encountered. In one embodiment recovery module 444 represents functions that actually reside on the disks themselves, in addition to features of a device driver for the particular disk. Recovery module 444 may further include timing mechanisms, as described above, with respect to spasmic disk processing to provide access bounds. The timing mechanism of recovery module 444 is optional, and if included, could work in conjunction with one or more timing mechanisms of disk access time bounding module 448, discussed below.

RAID 440 also includes disk offline module 446, which enables RAID 440 to selectively, temporarily disable I/O to a particular disk. RAID 440 includes disk access time bounding module 448, which provides particular functions to filer 400 for triggering and handling slow disk access. Disk access time bounding module 448 works in conjunction with disk offline module 446 and recovery module 444 to bound disk access times. In one embodiment disk access time bounding module 448 provides an additional error recovery layer to the error recovery provided by recovery module 444. Disk access time bounding module 448 may provide timing information and/or timing bounds to recovery module 444, and trigger disk offline module 446 to logically remove a disk temporarily from the logical group in the storage.

Consider an access request generated by higher layers 410 in connection with a client request for data stored on disk 464 (and potentially other disks). If disk 464 were to experience an error in processing the request (e.g., a mechanical error, bad media, an interface component error, etc.), the successful completion of the service requested could be delayed. Traditional systems would wait for disk 464 to complete the request, or fail the disk out of service, and reconstruct disk 464 to a spare (not shown) with data available from disks 462 and 456, and with parity disk 454. Instead, RAID 440 includes disk access time bounding module 448 to allow error processing to proceed when an error is experienced, but to set limits on how long error processing can proceed before other procedures are introduced to ensure bounds on the servicing of the access request. Disk access time bounding module 448 instructs/indicates to disk offline module 446 to selectively remove disk 464 from the logical group, and service the request and subsequent requests with the remaining disks in the logical group. Error recovery can proceed in an out-of-band manner with recovery module 444 while disk 464 is offline, and disk 464 can be assimilated back into the system when the error recovery is complete.

In one embodiment the combination of disk offline module 446, recovery module 444, and disk access time bounding module 448 represents an access time bounding agent, as discussed herein, for example, 130, 230, and/or 340 of FIGS. 1, 2, and 3, respectively. One or more features of one or more of these components may exist independently of an access time bounding agent, and access time bounding agent may include other features not provided by any of these components.

Figure 5:
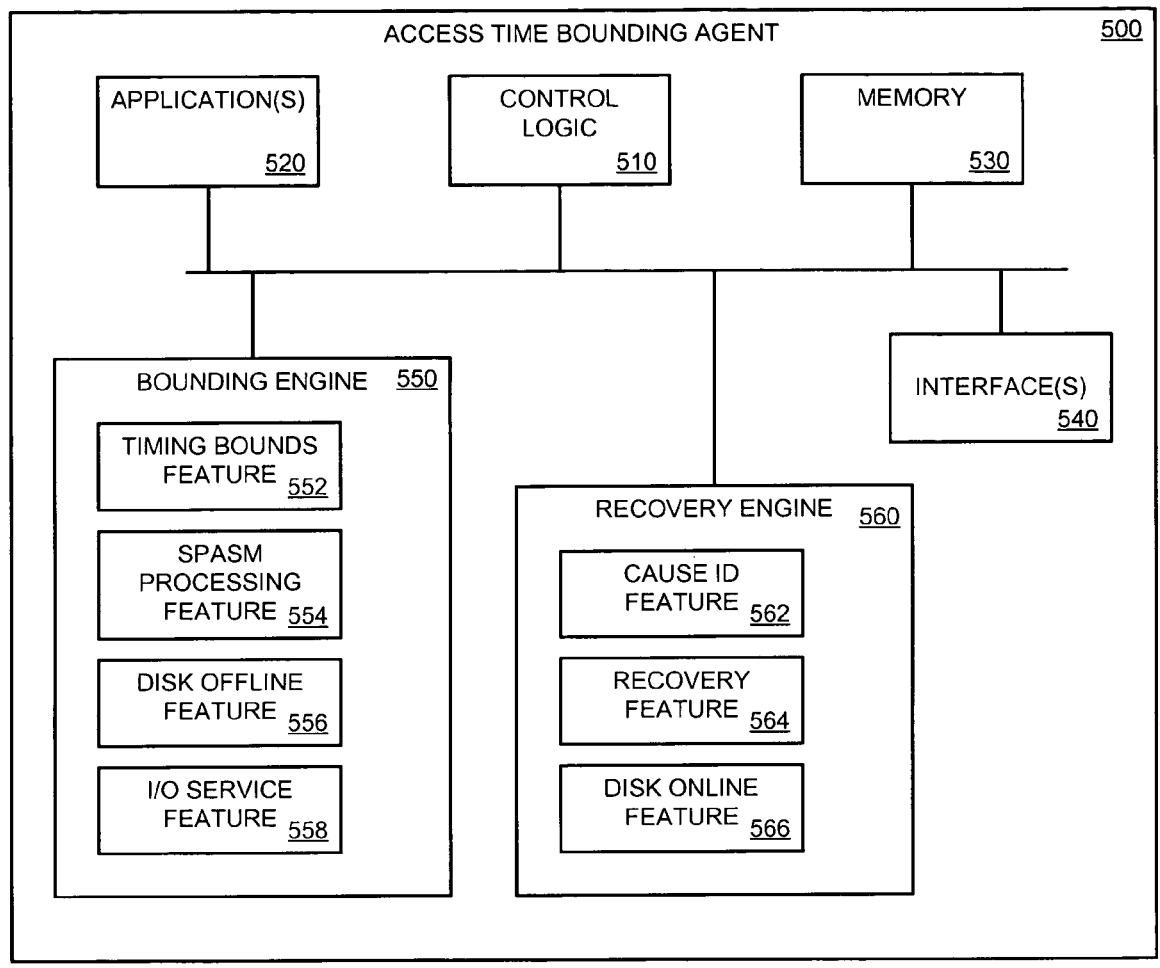
FIG. 5 is a block diagram of an embodiment of an access time bounding agent.

FIG. 5 is a block diagram of an embodiment of an access time bounding agent. Access time bounding agent 500 includes control logic 510, which implements logical functional control to direct operation of agent 500, and/or hardware associated with directing operation of agent 500. In one embodiment agent 500 includes one or more applications 520, which represent code sequence and/or programs that provide instructions to control logic 510. Agent 500 includes memory 530 and/or access to memory resource 530 for storing data and/or instructions. Agent 500 also includes one or more interfaces 540, which represent access interfaces to/from agent 500 with regard to entities (electronic or human) external to agent 500.

Agent 500 also includes bounding engine 550, which represents one or more functions that enable agent 500 to individually, selectively offline disks and manage issues related to disk reliability and timing of disk access. The functions include one or more of timing bounds feature 552, spasm processing feature 554, disk offline feature 556, and I/O service feature 558. Agent 500 also includes recovery engine 560, which represents one or more functions that enable agent 500 to monitor and manage error recovery of a disk. Recovery engine 560 implies an out-of-band recovery component, which enables agent 500 to have a disk recovery from error outside the context of servicing an I/O request. The functions associated with recovery engine 560 may include cause identification feature 562, recovery feature 564, and disk online feature 566. Other features may be included, making other versions of bounding engine 550 and/or recovery engine 560 that are more or less complex than what is shown in FIG. 5.

Timing bounds feature 552 enables bounding engine 550 to establish timing bounds on I/O access for a particular disk. The timing bounds may be different for different disks in a system, based on the type of disk and/or a connection protocol to the disk. In addition the timing bound might even be determined based on the application protocol (e.g., NFS, CIFS, FCP) timeouts. Alternatively all timing bounds can be set to be the same for a system. Timing bounds feature 552 also provides the ability to track the timing associated with an I/O operation, for example, monitoring how long the I/O operation has been pending, comparing the pending time with a threshold (time bound), determining how long an I/O operation is expected to take to complete (e.g., obtaining information from a state machine), etc.

Spasm processing feature 554 enables bounding engine 550 to have additional or secondary processing to handle disk errors, in addition to standard error processing available to a disk and/or its driver software. Spasm processing feature 554 does not necessarily supplant the standard error processing, and enables bounding engine 550 to ensure that I/O will be serviced within the bounds set by timing bounds feature 552. Whereas standard error processing will typically focus on implementing a best-efforts recovery schemed, without regard for timing, before assuming that the disk is failed and/or inaccessible, spasm processing feature 554 determines when the error processing takes longer than a target time for the system.

Disk offline feature 556 enables bounding engine 550 to selectively offline a disk. The ability to selectively offline a disk provides a mechanism to implement spasm processing feature 554. Disk offline feature 556 allows bounding engine 550 to temporarily remove a disk from a RAID group and/or other logical data structure, and place the disk in a state inaccessible to I/O. Being inaccessible to I/O, the disk can proceed to perform error recovery without slowing down the storage system, but without being failed out.

I/O service feature 558 enables bounding engine 550 to handle subsequent requests for I/O services/operations from an offlined disk. When disk offline feature 556 places a disk offline and inaccessible to I/O, I/O service feature 558 provides a mechanism to service subsequent I/O requests without full disk reconstruction, which allow the offline disk to remain part of the storage subsystem. In general, reads to the offline disk will be reconstructed from the redundant disks, and writes will be logged to another area of the storage system, and carefully tracked. Alternatively, reads and writes may occur based on mirrored or backed-up data. Synchronization of the writes can be completed as part of, in preparation for, or in conjunction with induction of the disk back into the subsystem.

Cause identification feature 562 enables recovery engine 560 to determine the cause of a disk error. Many routines for performing error cause identification are known, and will not be discussed in detail herein. Generally, cause identification feature 562 may analyze a disk to determine a state of the media, access a driver to check for an error message/report, run a cause identification algorithm, etc.

Recovery feature 564 enables recovery engine 560 to perform operations, for example, delays, resets, power cycles, retries, scrubbing, etc., to localize and recover from an error. The error may be a transient error that can be overcome by simply waiting and/or retrying. Standard error recovery algorithms are common on disks. Recovery feature 564 in one embodiment refers to the standard features associated with a disk. Alternatively, recovery feature 564 may refer to a specialized error recovery routine written for a particular system/application. In one embodiment recovery feature 564 occurs by default in a system, meaning that when an error occurs, the mechanisms may be in place to detect and begin execution of the recovery routines. In another embodiment a more elaborate or exotic recovery algorithm can be attempted that would decrease the disk failure rates and also improve the performance characteristics of the disk.

Disk online feature 566 enables recovery engine 560 to return a disk to the storage system/subsystem after a disk has recovered from an error. In one embodiment this simply refers to an ability to restore a disk to be accessible to I/O.

For example, a flag may be set to prevent the disk from processing I/O requests, and the flag be unset to online the disk. A system with the ability to selectively offline a disk may also have an automatic assimilation feature to induct the disk back into the system to actively serve data.

Access time bounding agent 500 may include hardware, software, and/or a combination of these. In a case where agent 500 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 6:
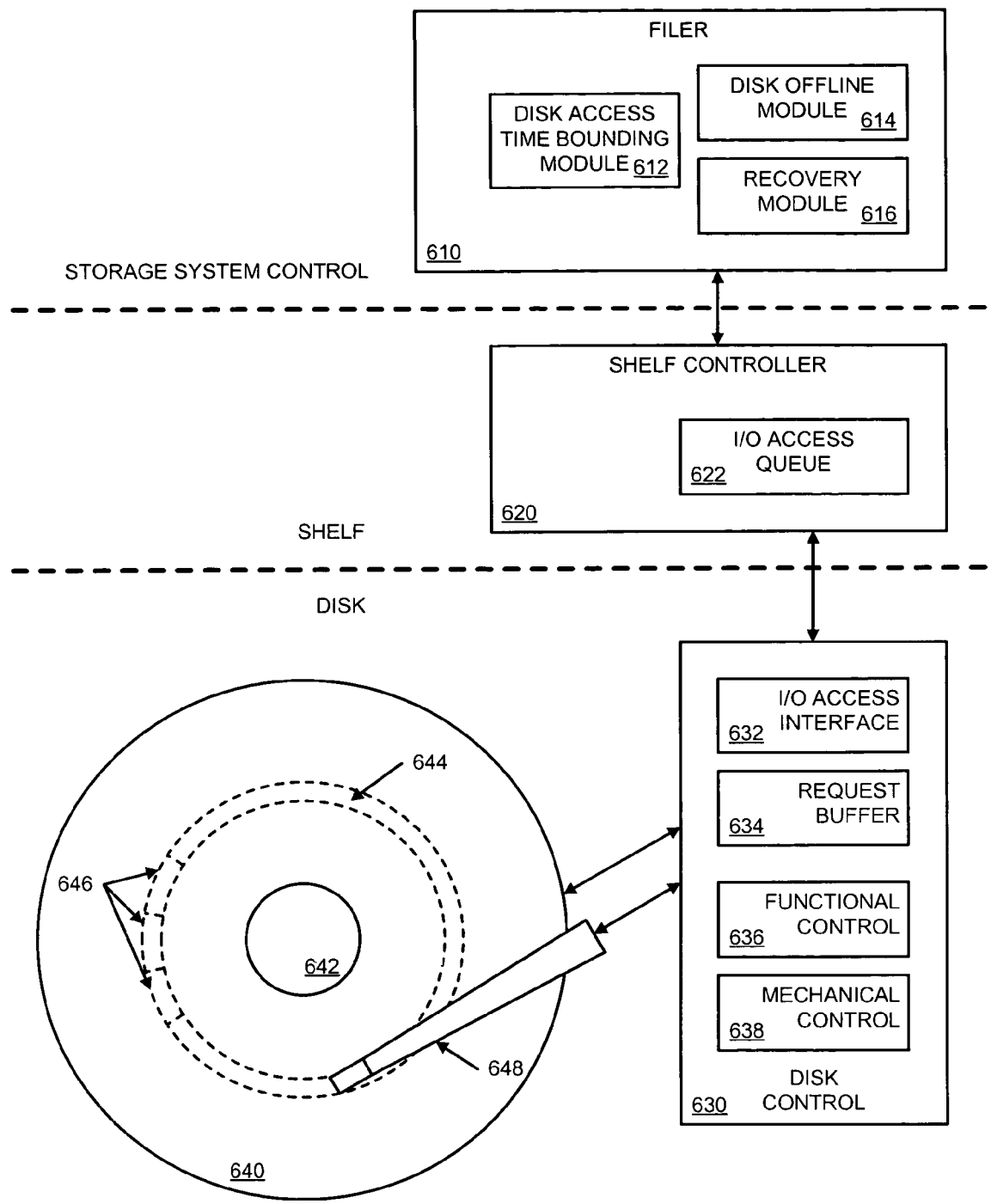
FIG. 6 is a block diagram of an embodiment of a filer with a disk access time bounding module coupled with a disk drive.

FIG. 6 is a block diagram of an embodiment of a filer with a disk access time bounding module coupled with a disk. Filer 610 is part of a storage system control, and includes disk access time bounding module 612, disk offline module 614, and recovery module 616. In one embodiment disk access time bounding module 612, disk offline module 614, and recovery module 616 are part of, or represent an access time bounding agent as discussed herein. Filer 610 with modules 612, 614, and 616 can detect a disk spasm resulting from an access request, determine that an error processing routine invoked as a result of the spasm will cause a service time for the access request to take longer than a threshold, and offline the disk to perform error processing while isolated from active I/O processing to recover from the error. Filer 610 receives a client request for data and translates the client request into a storage system request that is dispatched to applicable disk(s).

Filer 610 is coupled to shelf controller 620, which represents a component at a shelf level. The shelf level represents a component level where multiple disks share a common interface component/circuit in storage system. Shelf controller 620 includes I/O access queue 622, which receives and buffers the requests dispatched from filer 610. The precise details of the functioning of I/O access queue 622 are not necessarily significant to the operation of the access time bounding described herein, and will not be discussed. In one embodiment the dispatching of an I/O access request to the disk (and its subsequent placement in I/O access queue 622) provides the start of a timeout clock with respect to the I/O access request. Thus, the time of dispatch may be the starting time that will be compared against a threshold or bound time when determining if an access request has not been serviced within an acceptable period of time. In another embodiment it is possible to start measuring the time as soon as the I/O request is received as the filer or at the storage layer. It is not necessary to start the timer clock after the request has been dispatched to the disk. Using the time of dispatch can prevent conditions unrelated to a disk's performance from being the cause of invoking spasmic processing, for example, deep queues on filer 610.

At the disk level, a disk control 630 includes an I/O access interface 632, which represents one or more components for interfacing the disk with the shelf and the filer. Disk control 630 may include request buffer 634 to receive requests that are queued from shelf controller 620 to the disk. Alternatively, disk control 630 may service a single request at a time, and shelf controller 620 only issues a request out of I/O access queue 622 when a previously issued request has been completed. Request buffer 634 may alternatively represent a system in which I/O access queue 622 is an abstraction that shows a management and control function that shelf controller 620 may have over separate buffers in individual disks.

Disk control 630 includes functional control 636 (e.g., lookup tables, track/sector maps, etc.) and mechanical control 638 (e.g., servos, electronics), which represent one or more components to interface with a storage medium and translate requests into mechanical actions and other storage functions. The disk includes platter 640, which includes the physical media on which data is stored. Spindle 642 rotates platter 640 and aligns an area of platter 640 with head 648, which can detect and/or cause differences in the physical media, and thereby read/write to the disk. As platter 640 is rotated by spindle 642, a track or cylinder 644 is passed under head 648. Track 644 represents the various concentric divisions of platter 640 used for storing data. Each track, such as track 644, may be further divided into subsections often referred to as sectors, such as sectors 646. While description is made to a disk drive, other types of non-volatile storage device may be used, and the interface hardware and read/write mechanism may be different than what is depicted in FIG. 6.

If an access request dispatched from filer 610 and issued from I/O access queue 622 to the disk were directed to a sector 646 when an error or delay occurs, the sector 646 may be considered to be the cause of the error. Diagnostic and/or other error recovery may be performed to attempt to fulfill the request successfully. Such error recovery is discussed herein, and will not be set forth in detail here.

Figure 7:
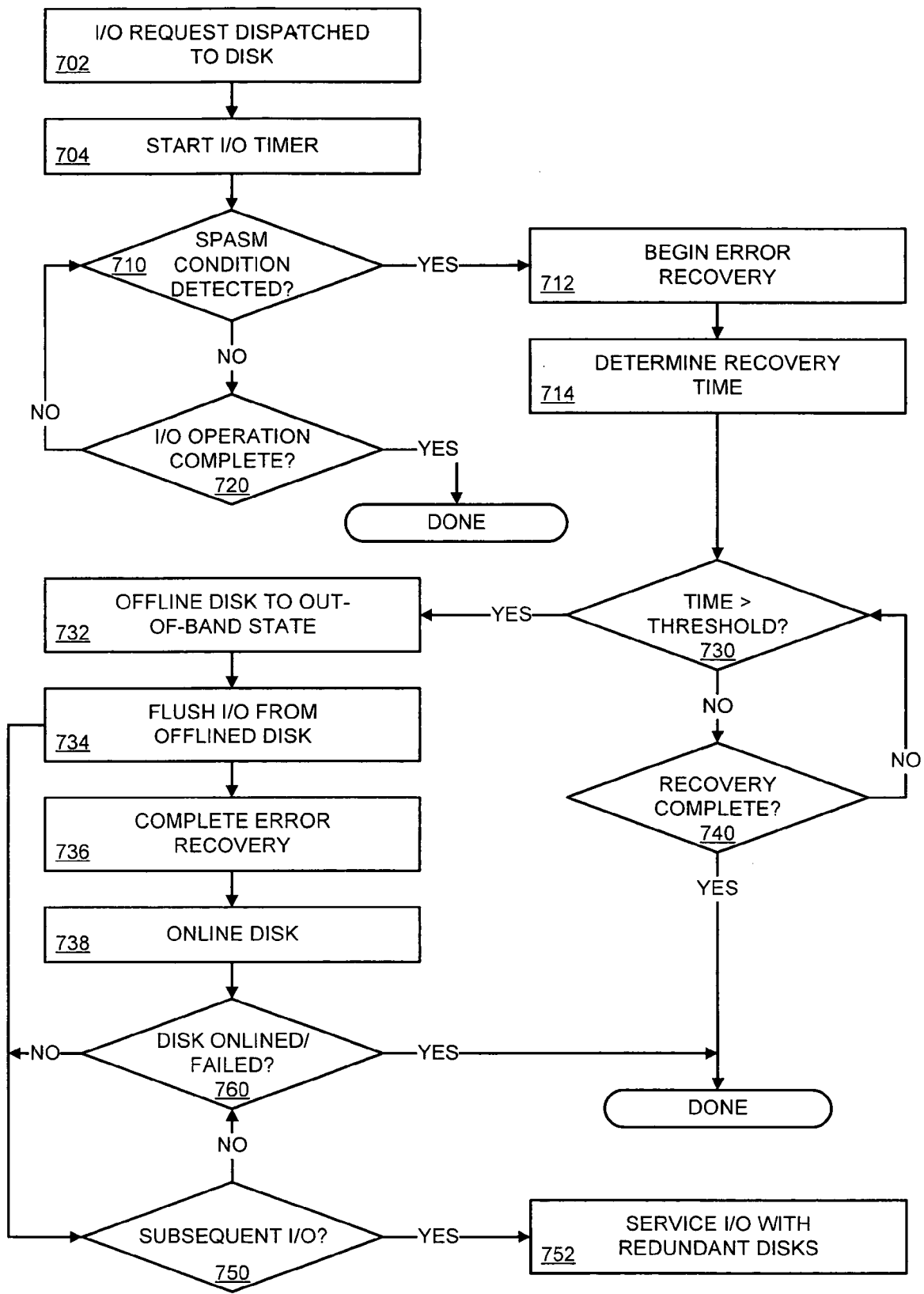
FIG. 7 is a flow diagram of an embodiment of a process for handling a drive experiencing a spasmic condition.

FIG. 7 is a flow diagram of an embodiment of a process for handling a spasming disk. A filer receives a client request for an I/O access, and dispatches an I/O request to a disk, 702. In one embodiment the dispatching of the request triggers the starting of an I/O timer, 704. In another embodiment the I/O timer is started as soon as the request is received at the storage layer. The I/O timer is controlled/managed by a timing module that includes a timer, counter, or equivalent. Starting the I/O timer refers to beginning to monitor the time taken to complete the request, which is monitored for purposes of bounding access request completion time.

The timing module and/or a bounding module determine if a spasm condition, or a spasm-inducing error, has occurred, 710. The module determines a spasm condition if there is an error or some other condition resulting in the operation of recovery/diagnostic routines. Because a spasm is typically defined as a condition where an I/O takes a long time, it is possible to transition to such a state even if there is no error. If a spasm condition is not detected, the timer continues to run, and the timing/bounding module waits for either the triggering of a spasm condition, or the completion of the I/O operation requested. In one embodiment waiting may include active polling, and in another embodiment waiting consists of performing other operations and/or remaining dormant until an interrupt, flag, message, etc., indicates a condition or a completion. If the I/O operation is complete, 720, the process ends with respect to the dispatched I/O request.

If a spasm condition is detected, 710, error recovery is initiated for the disk, 712. Error recovery may begin as an automatic process in a disk and/or between the disk and its driver. The error recovery that begins may be referred to as a "default" error processing, which attempts to recover the disk. In one embodiment a disk may have a standard algorithm that it will follow, which may include different phases or states of error recovery. Depending on the phase or state that the disk is in with error recovery, the driver and/or a timing module may be able to determine how long an expected error recovery should last. As discussed previously, if error recovery is expected to take longer than a threshold time, the disk may be forced into offline error recovery, even though the threshold has not yet been reached.

The timing/bounding module determines whether the time since the I/O timer was begun exceeds a threshold, 730. The threshold is set to bound how long an I/O access is allowed before servicing the I/O access with another mechanism, which can provide performance constraints on a storage system. In one embodiment the time includes not only the time since the I/O timer is started, but also the expected time of recovery from the current recovery phase/state, as discussed above. Thus, even if the time from initiating the I/O timer is less than the threshold, spasmic processing may be invoked if that time plus the time to recovery is greater than the threshold. If the time has not exceeded the threshold, the spasmic triggering mechanism waits for recovery to complete. If the recovery is complete, 740, spasmic processing may be avoided, and the process finished.

If the time is greater than the threshold, 730, an offline module offlines the disk to perform out-of-band error recovery, 732, where I/O to the disk is redirected from the disk to be serviced by reconstruction/dirty region logging, as previously discussed. Thus, pending I/O directed to the offline disk is flushed from an I/O access request queue, 734. Flushing a pending I/O refers to canceling or removing the I/O from a queue or buffer, and may include queuing or buffering the removed I/O with another disk or system/subsystem. The flushed I/O requests are handled by reconstruction/dirty region logging. If there is a subsequent I/O directed to the offline disk, 750, it will also be serviced with redundant disks, 752. If no subsequent I/O is received, the system may wait for the disk to either successfully complete error recovery, or determine that the disk is failed.

After flushing the I/O requests and directing them to be serviced to place bounds on their completion, the disk can be allowed to complete error recovery, 736. Because subsequent I/O will be handled without interaction with the offline disk, the disk can execute its error recovery processing to completion out-of-band. When the error recovery processing is completed, the disk can be onlined, 738. Onlining the disk may include synchronizing data writes that were logged to the dirty region. Either after the disk is onlined, or after the system determines that the disk should be failed (e.g., an unrecoverable error), 760, the process is finished.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The invention claimed is:

1. A method comprising:
   dispatching a data access request to a storage device of an array of storage devices;
   determining that a time from the dispatching of the data access request plus an expected error recovery time has exceeded a threshold, including identifying an expected error recovery procedure, determining an expected error recovery time for the error recovery procedure, and comparing the time from the dispatching plus the expected error recovery time against the threshold;
   in response to determining that the time has exceeded the threshold, temporarily isolating the storage device from other data access requests while allowing data access requests to other storage devices of the array, including logically offlining the storage device to a logical out-of-band state; and
   resuming data access to the storage device after a period of time to restore the storage device from isolation.

2. A method according to claim 1, wherein dispatching the data access request comprises storing the data access request in a data access request queue at the storage device.

3. A method according to claim 1, wherein determining the error recovery time further comprises determining the error recovery time from information about an error recovery phase of the storage device.

4. A method according to claim 1, wherein temporarily isolating the storage device from other data access requests further comprises:
   flushing a data access request from a data access request queue associated with the storage device; and
   servicing the flushed data access request with other storage devices of the array.

5. A method according to claim 1, wherein temporarily isolating the storage device from other data access requests further comprises:
   servicing a subsequently received data access request for data on the isolated storage device with other storage devices of the array.

6. A method according to claim 1, further comprising receiving from the storage device an indication that the storage device is experiencing an error.

7. A method according to claim 6, wherein resuming data access to the storage device after the period of time comprises resuming data access to the storage device after the storage device recovers from the error.

8. A method according to claim 6, further comprising:
   performing an out-of-band error recovery on the isolated storage device by performing error recovery during the temporary isolation.

9. A method according to claim 8, wherein performing error recovery comprises performing one or more of waiting for a period of time, resetting the storage device, or power cycling the storage device.

10. A method according to claim 6, wherein an error recovery routine is initiated and begins execution prior to temporarily isolating the storage device from other data access requests, and wherein performing error recovery on the isolated storage device during the temporary isolation comprises continuing the error recovery routine during the temporary isolation.

11. An article of manufacture comprising a machine accessible storage medium having instructions stored thereon using which an electronic system performs operations including:
- issuing an input/output (I/O) transaction request to a drive of an array of redundant drives;
- identifying an error recovery procedure to implement if an error occurs;
- determining an expected error recovery time for the error recovery procedure;
- comparing an amount of time elapsed since the issuing of the I/O transaction request adjusted by the expected error recovery time to a threshold;
- if the time elapsed adjusted by the expected error recovery time crosses the threshold, offlining the drive by diverting I/O transactions directed to the drive to other drives of the array for servicing, including logically offlining the drive to a logical out-of-band state; and
- determining whether to online the drive based, at least in part, on an error recovery state of the drive.

12. An article of manufacture according to claim 11, wherein comparing the amount of time adjusted by the expected error recovery time comprises obtaining the expected error recovery time from a state machine that tracks an error recovery state of the drive.

13. An article of manufacture according to claim 11, wherein offlining the drive by diverting I/O transactions directed to the drive to the other drives further comprises:
- removing an I/O transaction from an I/O transaction queue associated with the drive; and
- servicing the I/O transaction with the other drives of the array.

14. An article of manufacture according to claim 11, further comprising the medium having instructions with which the electronic system performs operations including:
- performing error detection and recovery on the drive.

15. An article of manufacture according to claim 14, wherein performing the error detection and recovery on the drive comprises executing the error detection and recovery while the drive is offline to provide an out-of-band error detection and recovery.

16. An article of manufacture according to claim 14, wherein performing the error detection and recovery comprises executing an error recovery algorithm built into the drive.

17. An article of manufacture according to claim 14, wherein performing the error detection and recovery comprises beginning an error detection and recovery routine prior to offlining the drive, and completing the error detection and recovery routine after offlining the drive.

18. An apparatus comprising:
- a memory component having code to define operations including determining that an access operation response time plus an expected error recovery time of a drive of a group of drives in a storage subsystem has exceeded a threshold amount of time, logically isolating the drive from access operations to temporarily place the drive in a logical out-of-band state to prevent access to the drive while maintaining access to the other drives of the group, servicing a request for access to the drive using other drives of the group, and determining whether to restore the drive from logical isolation after a period of time, wherein determining that the access operation response time plus the expected error recovery time of the drive has exceeded the threshold amount of time includes identifying an expected error recovery procedure, determining an expected error recovery time for the error recovery procedure, and comparing operation response time plus the expected error recovery time against the threshold amount of time; and
- a processor coupled to the memory component to execute the operations defined in the code.

19. An apparatus according to claim 18, further comprising the memory having code to define operations including executing an error detection and recovery procedure on the drive.

20. An apparatus according to claim 19, wherein executing the error detection and recovery procedure comprises executing the error detection and recovery out-of-band, during the period for which the drive is logically isolated.

21. An apparatus according to claim 19, wherein executing the error detection and recovery procedure comprises executing an error recovery algorithm defined in code in support software of the drive.

22. An apparatus according to claim 19, wherein executing the error detection and recovery procedure comprises beginning the error detection and recovery procedure prior to logically isolating the drive, and completing the error detection and recovery procedure after logically isolating the drive.

23. A storage server comprising:
- a processor;
- a communication interface coupled to a network to interface with a client over the network;
- a storage interface coupled to a mass storage subsystem to access one or more mass storage devices of the subsystem on behalf of the client; and
- a memory coupled to the processor having software, which when executed by the processor, causes the storage server to determine that an access operation response time plus an expected error recovery time of a drive of a group of drives in a storage subsystem has exceeded a threshold amount of time, logically isolate the drive from access operations to temporarily place the drive in a logical out-of-band state to prevent access to the drive while maintaining access to the other drives of the group, service a request for access to the drive using other drives of the group, and determine whether to restore the drive from logical isolation after a period of time, wherein determining that the access operation response time plus the expected error recovery time of the drive has exceeded the threshold amount of time includes identifying an expected error recovery procedure, determining an expected error recovery time for the error recovery procedure, and comparing operation response time plus the expected error recovery time against the threshold amount of time.

24. A storage server according to claim 23, further comprising the memory having software to cause the storage server to execute an error detection and recovery procedure on the drive.

25. A storage server according to claim 24, wherein the software to cause the storage server to execute an error detection and recovery procedure on the drive comprises software to cause the storage server to execute the error detection and recovery procedure while the drive is logically isolated from access operations, to perform an out-of-band error detection and recovery.

26. A storage server according to claim 24, the storage server to execute the error detection and recovery procedure comprising the storage server to execute an error recovery algorithm defined in code in support software of the drive.

27. A storage server according to claim 24, the storage server to execute the error detection and recovery procedure comprising the storage server to begin the error detection and recovery procedure prior to logically isolating the drive, and completing the error detection and recovery procedure after logically isolating the drive.

* * * * *